United States Patent
Keller et al.

(10) Patent No.: US 6,227,837 B1
(45) Date of Patent: May 8, 2001

(54) FACILITY FOR MANUFACTURING TWO- OR MULTI-COMPARTMENT TUBES

(75) Inventors: Gerhard Keller, Jongny; Dominique Favre, Champéry, both of (CH)

(73) Assignee: Aisa Automation Industrielle S.A., Voury (CH)

(*) Notice: Subject to any disclaimer, the term of this patent is extended or adjusted under 35 U.S.C. 154(b) by 0 days.

(21) Appl. No.: 09/269,864
(22) PCT Filed: Oct. 2, 1997
(86) PCT No.: PCT/EP97/05422
  § 371 Date: May 21, 1999
  § 102(e) Date: May 21, 1999
(87) PCT Pub. No.: WO98/14319
  PCT Pub. Date: Apr. 9, 1998

(30) Foreign Application Priority Data

Oct. 2, 1996 (DE) ............................................. 196 40 833

(51) Int. Cl.⁷ .................................................. B29D 23/20
(52) U.S. Cl. ............................................ 425/112; 425/393
(58) Field of Search ................................. 425/112, 129.1, 425/392, 393

(56) References Cited

U.S. PATENT DOCUMENTS

| 2,390,171 | 12/1945 | Ratay ........................... 156/498 |
| 3,081,926 | 3/1963 | Newton ......................... 229/5.6 |
| 3,101,850 | 8/1963 | Quinche ....................... 198/468.2 |
| 3,227,319 | 1/1966 | Rosier ........................... 222/94 |
| 3,290,422 | 12/1966 | Michel ........................... 264/259 |
| 3,446,688 | 5/1969 | Flax ............................... 156/423 |
| 3,991,294 | 11/1976 | Evans ............................. 219/633 |
| 4,302,176 | * 11/1981 | Gordon .......................... 425/392 |
| 4,768,323 | 9/1988 | Coutant et al. ................. 52/309.1 |
| 5,076,470 | 12/1991 | Hatakeyama et al. .......... 222/94 |
| 5,900,086 | * 5/1999 | Keller ............................. 156/69 |

FOREIGN PATENT DOCUMENTS

| 24 53 503 | 5/1975 | (DE) . |
| 36 16 207 | 11/1987 | (DE) . |
| 195 22 169 | 1/1997 | (DE) . |
| 2011344 | 7/1979 | (GB) . |
| 4-158017 | 6/1992 | (JP) . |

OTHER PUBLICATIONS

Extract of letter sent to colleagues in Australia regarding the citation US 3, 991, 294.

* cited by examiner

Primary Examiner—Harold Pyon
Assistant Examiner—Donald Heckenberg
(74) Attorney, Agent, or Firm—Collard & Roe, P.C.

(57) ABSTRACT

The invention relates to an apparatus for the manufacture of dual- or multiple-chamber tubes from tube bodies (6, 6', 6'') comprising one single partition (7) or a plurality of partitions (18, 19; 20), provided with a tube head having a discharge aperture adapted to be closed, using mandrels corresponding to the inner contour of the desired tube and adapted to be assigned to working stations, the mandrels being divided longitudinally into individual sectional mandrels (3, 4; 17a, b, c; 21a, b) corresponding to the number of chambers provided and leaving a gap (5) between them, the respective sectional mandrels (3, 4; 17a b, c; 21a, b) having a cross-section matching the cross-section of the cavity of an individual chamber of the respective multiple chamber tube.

12 Claims, 3 Drawing Sheets

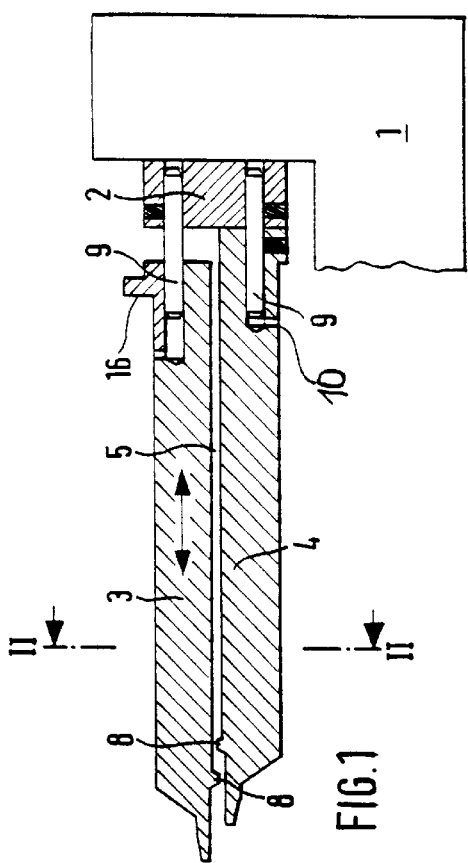
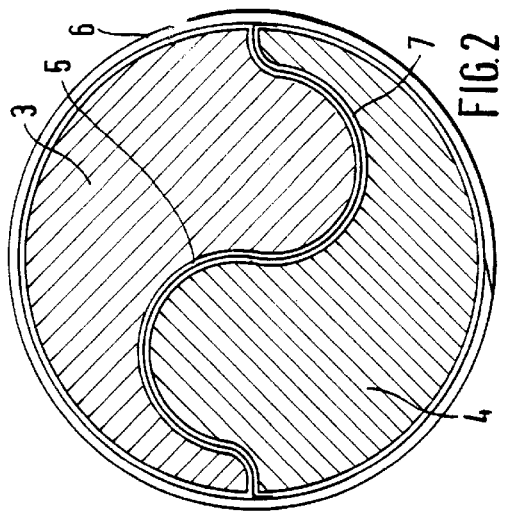
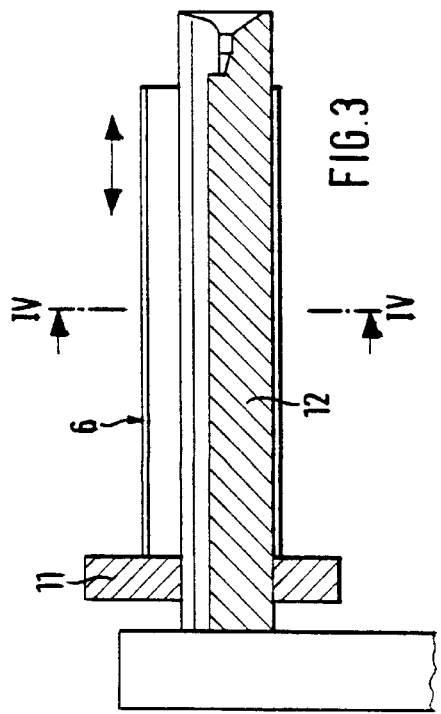
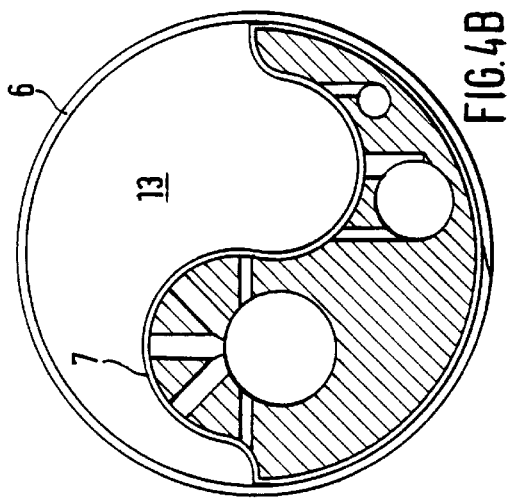
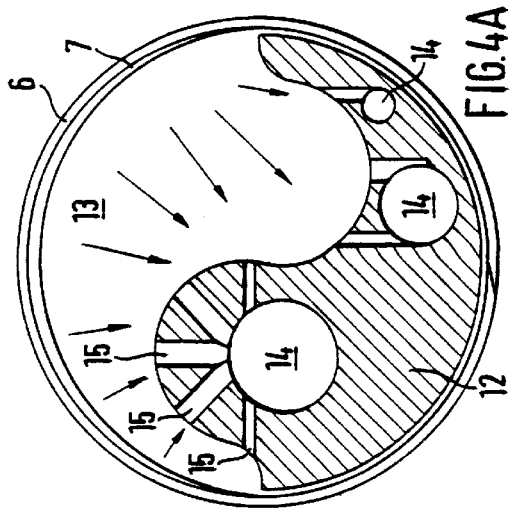

FACILITY FOR MANUFACTURING TWO- OR MULTI-COMPARTMENT TUBES

The invention relation to an apparatus for the manufacture of dual- or multiple-chamber tubes.

Various apparatus for the manufacture of single-chamber tubes are known using mandrels adapted to be assigned to a plurality of working stations, a tube body being slid onto the mandrels in at least one working station, and being connected in fixed relationship to a prefabricated or moulded tube head in further stations.

A need exists to provide dual chamber tubes or multiple chamber tubes utilising prefabricated tube bodies partitioning the tube body in the tube interior into two or more longitudinal chambers, parallel to one another, by means of one or a plurality of partitions.

No apparatus for the manufacture of multiple chamber tubes are known at present utilising a prefabricated tube body comprising one partition or a plurality of partitions.

From U.S. Pat. No. 5,076,470 a tube is known consisting of two or three concentrically arranged tube bodies, adapted to be connected to a tube head, comprising a separate discharge aperture for each annular chamber formed by the concentric arrangement of the individual tube bodies of varying diameter, in which context the individual tube bodies can be slid onto concentrically arranged mandrels in order to connect the individual tube bodies to the head portion, relative axial displacements being possible between the individual concentric mandrels.

It is the problem of the invention to provide an apparatus for the manufacture of dual-chamber tubes or multiple-chamber tubes by means of a prefabricated tube body.

The use of individual sectional mandrels, leaving a gap between one another, the respective sectional mandrels having a cross-section which in each case corresponds to the cross-section of the cavity of an individual chamber of the desired dual chamber or multiple chamber tube, makes it possible to apply the prefabricated tube bodies with partitions onto the mandrels comprising sectional mandrels, the appropriate partition(s) being introduced into the gap(s). The tube body with a partition positioned in this manner is then provided with a tube head in one or more working steps. This is performed preferably by press moulding or transfer moulding or even by injection moulding, partition webs in the head and connections of the partition webs to the partitions being simultaneously likewise produced during the moulding process.

Figure 5:
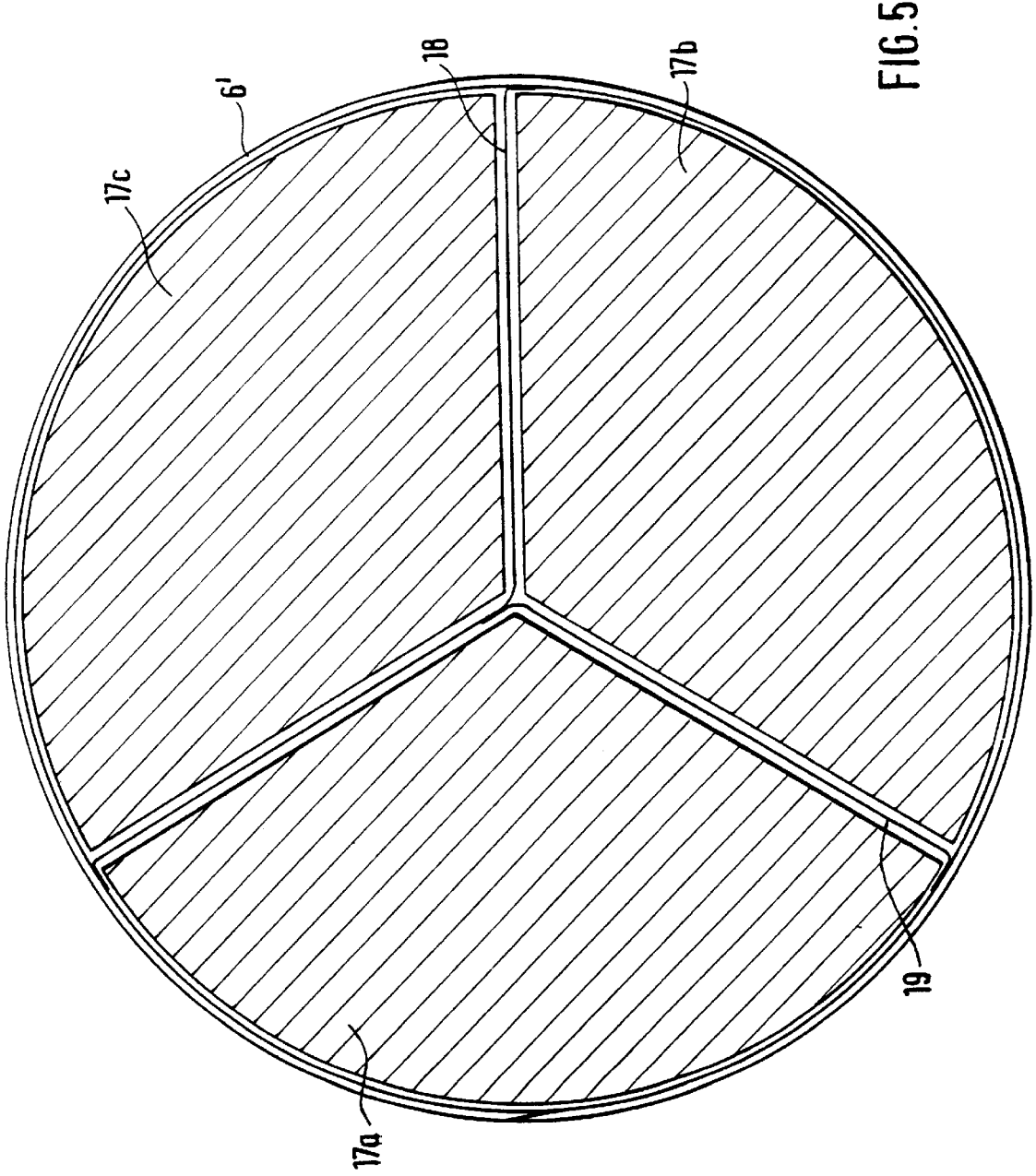
Figure 6:
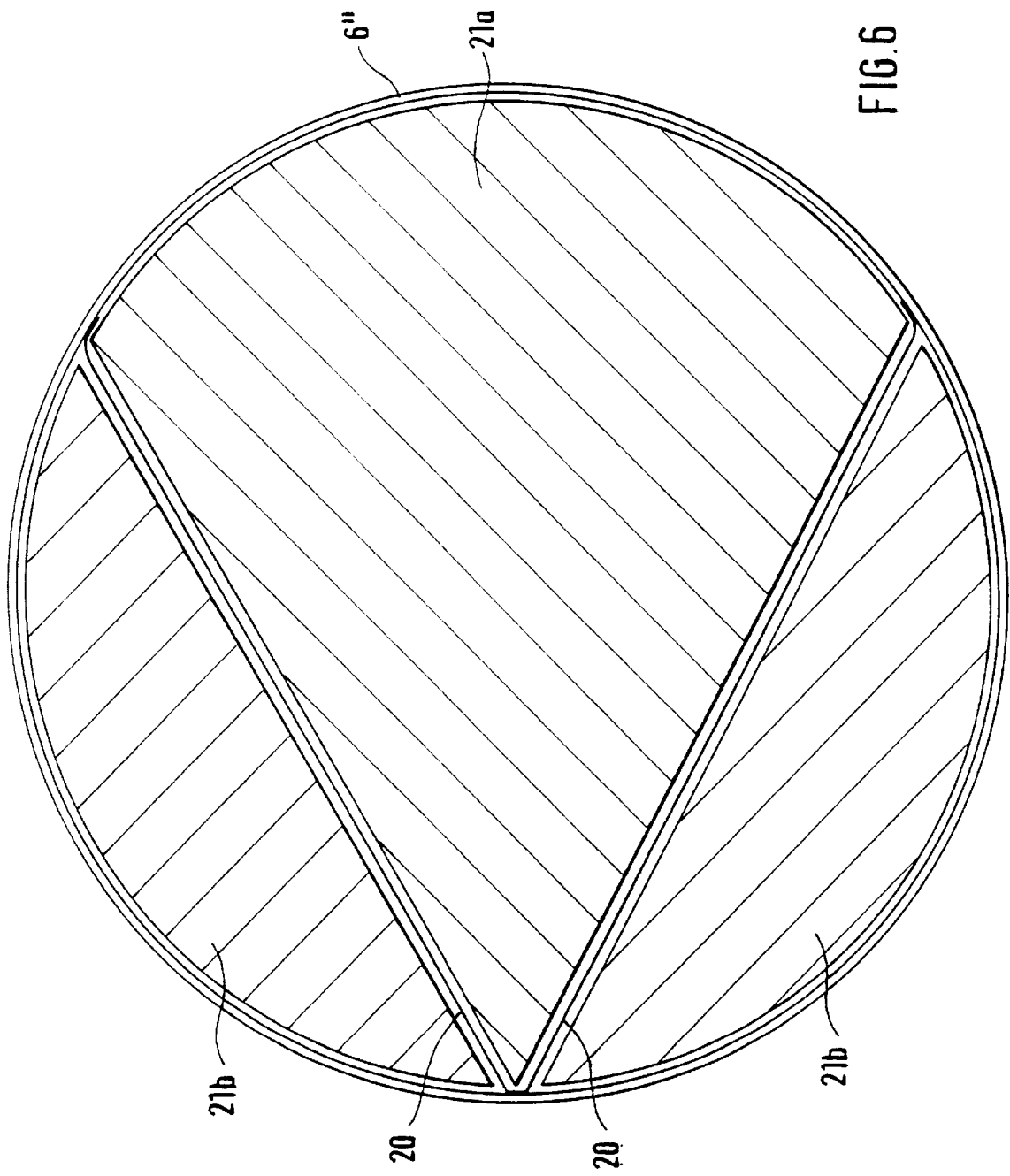

The invention is further elucidated in the following by way of working examples with reference to the drawings. There are shown in:

FIG. 1 a mandrel consisting of two sectional mandrels,

FIG. 2 a section along line II—II of FIG. 1,

FIG. 3 an auxiliary mandrel with a tube body in a schematic illustration,

FIG. 4a a cross-section along line IV—IV of FIG. 3, the partition being flush with the periphery of the tube body, FIG. 4b the same as in FIG. 4a, the partition, however, being flush with the rebate in the auxiliary mandrel, FIG. 5 the cross-section of a mandrel consisting of three identical sectional mandrels for a three-chamber tube comprising chambers of equal sizes, FIG. 6 the cross-section of a mandrel consisting of three sectional mandrels for a three-chamber tube comprising one larger and two smaller chambers.

In the embodiment shown in FIG. 1 a mandrel consisting of two sectional mandrels 3, 4 is provided by means of a support means 2 on a transport means 1 which may e.g. be a revolving plate, a rotary drum, a turntable, a transport chain or the like, the said mandrel with its outer contour corresponding to the inner contour of a dual-chamber tube, including head region, to be manufactured. A gap 5 is provided between both sectional mandrels 3, 4 serving to accommodate a partition 7 to be provided inside the tube body 6. The gap 5 may be of curved cross-section, for example S-shaped as illustrated in FIG. 2, or it may be rectilinear (see FIG. 6), or rectilinear sections in angular relationship (see FIG. 5) or it may be optionally designed in rectilinear and curved sections (not shown).

Preferably, a sectional mandrel 4 is provided on the support means 2 in fixed relationship while the other sectional mandrel 3 is provided movably parallel to the sectional mandrel 4, the said support means in turn being preferably pivotally mounted, e.g. for further operations, and optionally being adapted to be driven,. The sectional mandrels 3, 4 comprise projections 8, preferably directed in opposition to one another serving to reduce the passing-through cross-section of the gap 5 in a cross-sectional plane. If both sectional mandrels 3 and 4 abut against the support means 2, that is to say not displaced relative to one another, the projections a are in one plane. Preferably, the projections are rounded at their tips and have a cross-section similar to a bell curve facilitating the sliding-in of a partition 7 when being inserted into the gap 5. At least one sectional mandrel 3 or 4 comprises ducts 9 terminating by way of discharge apertures 10 at the outer circumference of the appropriate sectional mandrel 3 or 4 and/or towards the gap 5 (both not shown). The ducts 9 may also be provided in all existing sectional mandrels 3 and 4; 17a–c;21a , b and are adapted to be connected to a vacuum source, not shown, adapted to be switched off. The duct system serves to hold the positioned tube body 6 in position at its periphery and/or in relation to its partition during shifting with the movable sectional mandrel 3 or in its final position on the mandrel, in particular during transport and/or further processing steps.

If the tube bodies 6 are provided with a relatively rigid, free-standing partition 7, the tube body 6, by means of an appropriate means, preferably likewise comprising a rotation means, may be aligned coaxially in relation to the sectional mandrels 3, 4 in such a manner that the partition 7 fixed to the tube body 6 comes to rest opposite the gap 5 between the sectional mandrels 3, 4. By means of a slider 11, schematically illustrated in FIG. 3, the aligned tube body 6 can then be pushed onto the sectional mandrels 3, 4, the partition 7 thereby entering the gap 5.

If a relatively rigid partition material is employed, the two sectional mandrels 3, 4 may remain in their original position at the support means 2, i.e. they may both also be provided in fixed relationship on the support means 2. The entry into the gap 5 may then preferably also be designed slightly funnel-like or conically (not illustrated), for an easier insertion of the partition 7.

In the case of relatively thin to very thin partitions 7, it is advantageous to design at least one sectional mandrel 3, as described above, movable to and fro axially and parallel to the other sectional mandrel 4. In the case of more than two sectional mandrels, a plurality of sectional mandrels, extendible preferably to various distances, may be provided. In a position of the sectional mandrels 3, 4, displaced in relation to one another, as shown in FIG. 1, the projections 8 are likewise displaced in relation to one another, thereby enlarging there in each case the available cross-section of the gap 5 as compared with their position directly opposite to one another so that the partition 7 in conjunction with the rounded-off sections of the projections 8 can be inserted into the gap 5 more easily. If the sectional mandrel 3 of FIG. 1 is then shifted back to the right into its one terminal position, the projections 8 of both sectional mandrels 3, 4 are in one plane thereby forming a guidance and also a support for the partition 7 where it adjoins the head region.

If a partition web or, where applicable a plurality of partition webs (not shown) is/are to be manufactured separately or simultaneously with the actual tube head (not shown) by its/their connection to the partition 7 or partitions 18, 19, FIG. 5, 20, FIG. 6 by molten synthetic resin, the entry region of the gap 5, preferably up to the projections 8, may have a greater open cross-section than the gap 5 behind the projections 8. This also permits the adaptation of the thickness of the partition web/webs in the head and its or their connection to the partition 7 or a plurality of partitions in the tube body 6 within a wide range. In the condition where the two projections 8 are directly opposite to one another, the open cross-section of each gap 5 between the projections 8 is preferably so calculated that the spaced apart relationship of the projections 8 exceeds the thickness of the partition 7 of the tube body 6 only slightly so that the projections 8 define the mould cavity for the partition web to be moulded-on during manufacture of the partition webs.

If a provided partition 7 is very soft and/or very thin and thus also very flexible, an auxiliary mandrel 12 (see FIGS. 3 and 4) is preferably assigned to the apparatus for receiving a tubular body 6 having a partition 7. Each auxiliary mandrel 12 has a cross-section corresponding to the configuration of one of the chambers, preferably the largest chamber in the case of differently sized chambers, of a dual chamber tube or a multiple chamber tube. Each auxiliary mandrel 12 comprises a rebate 13 extending over its entire length, corresponding in cross-section to the cross-section of the respective other chamber or all further chambers. The auxiliary mandrel 12 is preferably designed as a solid body in which a system of ducts 14 is provided which may comprise different passage cross-sections over its length, distributed preferably over the cross-section, provided with bored passages 15, distributed both over the cross-section and the length, all terminating in the rebate 13. The ducts 14 and therefore also the bored passages 15 are adapted to be connected to a vacuum source (not shown), in which case a vacuum may be brought about in the rebate 13 in order to suck the partition 7 (see FIG. 4a) abutting against the tube wall 6 in the original state, into-the rebate 13, the partition 7 in the final state bearing directly against the auxiliary mandrel 12 (see FIG. 4b). In the case of thin partitions electrostatic attraction may be applied instead of the vacuum.

The above described aligned application of the tubular body 6 onto the auxiliary mandrel 6 must ensure that the partition 7, or at least a desired portion thereof, may move freely into the rebate 13 in contact therewith.

The auxiliary mandrel 12, including the sucked on partition 7, or the sucked on partition portion respectively, is already or will be so aligned in relation to the sectional mandrels 3, 4 that the partition 7, position fixed in the rebate 13, comes to rest opposite the gap 5 between the sectional mandrels 3, 4. The tube body 6 is then pushed onto the sectional mandrels 3, 4 by the slider 11. While being pushed on, the sectional mandrels 3, 4 assume the position, displaced to one another, as shown in FIG. 1 so that the thin partition 7 may readily enter the gap 5 past the projections 8. If the tube body 6 with its front end abuts against a stop 16 (FIG. 2) on the movable sectional mandrel 3, the advancing Of the slider 11 (FIG. 2) is stopped and, if applicable, the duct system of the sectional mandrel 3 is connected to a vacuum source thus fixing the tubular body 6 to the sectional mandrel 3. The sectional mandrel 3 is then moved into its final position abutting against the support means 2. A positional fixation may then also be performed via the sectional mandrel 4 if the latter is likewise connected to a vacuum source. In the positionally-fixed position the tube body 6 is passed to one or more further working stations where the manufacture of partition webs takes place separately or simultaneously with the head as well as the connection takes place of the partition web to the partition, the partition webs to the partitions as the case may be as well as to the optionally prefabricated head including the optionally prefabricated partition webs and the tube body—optionally also in a plurality of individual or partial step.

In FIG. 5 three sectional mandrels 17a, b, c are illustrated, the tube body 6 comprising a partition 18, provided at an angle, both ends of the said partition 18 fixed to the tube body 6' and comprising a connecting partition 19, fixed on the one hand in the apex of the partition 18, provided at an angle, and to the tube body 6' on the other hand. In the embodiment according to FIG. 5 three sectional mandrels of the same size and therefore also chambers are illustrated.

In the embodiment according to FIG. 6 two partitions 20 are designed as secants to the round cross-section of a tube body 6" fixed at a common point to the tube body 6". The sectional mandrels 21a, b in turn have cross-sections corresponding to the intended chamber cross-sections.

In such multiple chamber tubes the tube body 6', 6" becomes relatively dimensionally stable due to the disposition of the partitions 18, 29 20 in the latter, so that an auxiliary mandrel may possibly be dispensed with. In as far as an auxiliary mandrel is used, its cross-section should preferably correspond to the cross-section of the largest chamber.

The apparatus may also be used for the purpose of initially disposing prefabricated separate partitions in a gap, or, where applicable, in a plurality of provided gaps, for which purpose the gaps may for example be as illustrated and/or described above. The partitions in that case comprise side wings (not shown) projecting from the mandrels, preferably deflected at the location where they exit from the mandrel or comprise a flange there so that they lie as flush as possible against the outer wall of the mandrel. This may also be performed by a separate pressing on or moulding on means . Onto such a mandrel provided with separately manufactured partitions a separate tube body—without partition or partitions—is then pushed on in such a manner that the wings abut closely to the inner tube wall.

The connection to a head and to partition webs is carried out in the above described manner. If the wings are sufficiently wide, in particular if the individual components to be accommodated in the chambers cannot be mixed or can only be mixed with difficulty and/or if their separation from one another is not absolutely necessary, a connection of the wings to the tube wall in fixed relationship, separating the chambers from one another in sealing relationship, may be dispensed with. Appropriate connection means may, however, also be provided in the sectional mandrels, for example for welding the wings to the tube body by supplying contact heat, e.g. by means of appropriate metal parts heated by HF and provided in the sectional mandrels opposite the wings.

The tube bodies may be manufactured from any suitable material from one or more synthetic resins, from laminated material, also with blocking layers of metal or synthetic material by an overlap seam or by extrusion. There is also no restriction regarding the material for the partitions.

The vacuum may also be so controlled, in particular in the auxiliary mandrels 12, that a successive suction and thus also a successive entering into contact of the partition 7 takes place over the cross-section of the rebate 13.

What is claimed is:

1. An apparatus for the manufacture of dual- or multiple chamber tubes from tube bodies (6, $6^1$, $6^{11}$) provided with at least one partition (7, 18, 19, 20) deflectably fixed to the tube inner wall and contains a tube head with a closeable discharge aperture comprising:

a mandrel disposed in the tube body longitudinally divided into sectional mandrels (3, 4, 17a, b, c,21a, b), with a gap therebetween, said sectional mandrels correspond to the number of chambers provided and have a cross section that correspond to the chamber cavity;

at least one auxiliary mandrel (12) coaxially positioned in relation to one of said sectional mandrels (3, 4) for receiving the tube body (6), wherein said auxiliary mandrel (12) comprises at least one axially oriented rebate (13) opened towards the periphery; and a device for moving at least one section of the deflectable partition (7) into said rebate (13) and for pushing the tube body (6) from said auxiliary mandrel (12) onto said at least one mandrel.

2. The apparatus according to claim 1, wherein said at least one auxiliary mandrel (12) is a solid body having a cross section corresponding to the cross section of one of the chambers of the multiple chamber tubes and said rebate (13) corresponds to the remaining cross sections of the multiple chamber tube.

3. The apparatus according to claim 1, wherein said device for moving one section of said partition (7) into said rebate (13) comprises a vacuum source capable of being turned off.

4. The apparatus according to claim 1, wherein each gap (5), taken at right angles to its longitudinal extension, has a rectilinear cross-section.

5. The apparatus according to claim 1, wherein each gap (5), taken at right angles to its longitudinal extension, has a curved cross-section.

6. The apparatus according to claim 5, wherein each gap (5), taken at right angles to its longitudinal extension, has an S-shaped cross-section.

7. The apparatus according to claim 1, wherein at least one sectional mandrel (3) in relation to the other sectional mandrels (4) is so disposed as to be displaceable axially and parallel in relation to one another.

8. The apparatus according to claim 7, wherein said sectional mandrel (4) is provided in fixed relationship on a support means (2).

9. The apparatus according to claim 8, wherein said support means (2) is pivotally mounted.

10. The apparatus according to claim 1, wherein each sectional mandrel (3), in at least one plane comprises projections (8) reducing the cross-section of said gap (5) between them and directed in opposition to one another.

11. The apparatus according to claim 1, wherein at least one sectional mandrel (3) comprises a duct system provided with discharge apertures directed towards the gap (5) and the periphery, said duct system being connected to a vacuum source, capable of being turned off.

12. The apparatus according to claim 3, wherein said at least one auxiliary mandrel (12) comprises a system of ducts (14) linked to discharge apertures (15) terminating in said rebate (13).

* * * * *